United States Patent
Tinnin

(10) Patent No.: US 9,663,133 B2
(45) Date of Patent: May 30, 2017

(54) INTERMEDIATE SHAFT FOR STEERING COLUMN WITH BEARING AND LOCK SLEEVE

(71) Applicant: Steering Solutions IP Holding Corporation, Saginaw, MI (US)

(72) Inventor: Melvin L. Tinnin, Clio, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 8 days.

(21) Appl. No.: 14/180,591

(22) Filed: Feb. 14, 2014

(65) Prior Publication Data

US 2014/0230597 A1    Aug. 21, 2014

Related U.S. Application Data

(60) Provisional application No. 61/765,296, filed on Feb. 15, 2013.

(51) Int. Cl.
| | |
|---|---|
| B62D 1/18 | (2006.01) |
| B62D 1/16 | (2006.01) |
| F16D 1/02 | (2006.01) |
| F16D 3/40 | (2006.01) |

(52) U.S. Cl.
CPC ............... B62D 1/16 (2013.01); *F16D 1/02* (2013.01); *F16D 3/40* (2013.01)

(58) Field of Classification Search
USPC ................................ 280/775, 777, 492, 493
See application file for complete search history.

(56) References Cited

U.S. PATENT DOCUMENTS

| | | | |
|---|---|---|---|
| 3,009,499 A | 11/1961 | Weihe | |
| 3,342,237 A | 9/1967 | Meehan | |
| 3,999,583 A | 12/1976 | Nelson | |
| 4,219,064 A | 8/1980 | Lozano | |
| 4,883,397 A | 11/1989 | Dubost | |
| 4,900,178 A | 2/1990 | Haldric | |
| 4,955,772 A | 9/1990 | Reck | |
| 5,253,949 A | 10/1993 | Oxley | |
| 5,273,384 A | 12/1993 | Dunbar | |
| 5,294,224 A | 3/1994 | Kent | |
| 5,423,646 A | 6/1995 | Gagnon | |
| 5,606,892 A * | 3/1997 | Hedderly | 74/493 |
| 5,765,408 A * | 6/1998 | Sanseverino | 70/14 |
| 5,890,858 A | 4/1999 | Leroux | |
| 5,961,264 A | 10/1999 | Postadan | |
| 6,006,414 A | 12/1999 | Corporon | |
| 6,010,289 A | 1/2000 | DiStasio | |
| 6,155,739 A | 12/2000 | Sekine | |
| 6,263,562 B1 | 7/2001 | Gosis et al. | |
| 6,533,666 B2 * | 3/2003 | Garcia | B62D 1/16 464/75 |
| 6,711,809 B1 | 3/2004 | Fischer | |
| 6,770,825 B1 | 8/2004 | Hildebrand | |
| 7,318,687 B2 | 1/2008 | Appleyard | |

(Continued)

*Primary Examiner* — Faye M Fleming
(74) *Attorney, Agent, or Firm* — Cantor Colburn LLP

(57) ABSTRACT

In one aspect of the invention, an intermediate shaft for a steering column assembly of a vehicle is provided. The intermediate shaft includes a shaft element, a universal joint coupling including an inner yoke coupled to the shaft element and an outer yoke coupled to the inner yoke, and at least one of a bearing and a lock sleeve coupled to the outer yoke.

10 Claims, 3 Drawing Sheets

(56) References Cited

U.S. PATENT DOCUMENTS

| | | |
|---|---|---|
| 7,513,709 B2 | 4/2009 | Shimada |
| 7,517,284 B2 | 4/2009 | Sekine |
| 8,231,476 B2 | 7/2012 | Kakimoto |
| 2001/0012471 A1 | 8/2001 | Iitsuka |
| 2002/0076300 A1 | 6/2002 | Patterson |
| 2002/0131820 A1 | 9/2002 | Daniel et al. |
| 2004/0001743 A1 | 1/2004 | Hulin |
| 2004/0185947 A1 | 9/2004 | Kinme |
| 2005/0129481 A1 | 6/2005 | Wimmer |
| 2006/0034650 A1 | 2/2006 | Appleyard |
| 2007/0237571 A1 | 10/2007 | Shimada |
| 2007/0259721 A1 | 11/2007 | Scrimpsher et al. |
| 2009/0285651 A1 | 11/2009 | Cooley |
| 2009/0311071 A1 | 12/2009 | Allen et al. |
| 2011/0088502 A1 | 4/2011 | Brown et al. |
| 2012/0284973 A1 | 11/2012 | Glaser |
| 2012/0326424 A1 | 12/2012 | Zaloga |
| 2013/0017892 A1 | 1/2013 | Moriyama et al. |
| 2013/0026750 A1 | 1/2013 | Doerr |
| 2013/0069345 A1 | 3/2013 | Williams |
| 2013/0260903 A1 | 10/2013 | Kim |
| 2013/0327496 A1 | 12/2013 | Hirukawa |
| 2014/0140759 A1 | 5/2014 | Bodtker |
| 2014/0147197 A1* | 5/2014 | Yoshida et al. ............ 403/359.1 |
| 2014/0230597 A1 | 8/2014 | Tinnin |
| 2014/0345091 A1 | 11/2014 | Pierce |

* cited by examiner ature apparent from the following detailed description taken in conjunction
INTERMEDIATE SHAFT FOR STEERING COLUMN WITH BEARING AND LOCK SLEEVE

CROSS-REFERENCES TO RELATED APPLICATIONS

This patent application claims priority to U.S. Provisional Patent Application Ser. No. 61/765,296, filed Feb. 15, 2013, which is incorporated herein by reference in its entirety.

FIELD OF THE INVENTION

The subject invention relates to a vehicle steering assembly, and more particularly to a vehicle steering assembly with improved attachment zones between an intermediate shaft and a steering column shaft.

BACKGROUND OF THE INVENTION

Some known vehicle steering assemblies are configured such that when a driver rotates a steering wheel in a desired direction, a steering column shaft connected to the steering wheel is rotated, and an intermediate shaft transmits the rotary force of the steering shaft through a universal joint to a gear box, which may include a rack and pinion gear.

The gear box converts the rotational motion of the steering shaft into a rectilinear motion by the rack and pinion gear, and transmits the rectilinear motion to a rack bar. As such, the rack bar transmits the force to a tie rod connected to a tire knuckle such that the driving direction of the vehicle can be changed.

The axis between the steering shaft and the gear box is configured by an input shaft and an output shaft which are angled to each other rather than being coaxially aligned, which makes it difficult to transmit power with a conventional shaft coupling method. As such, an intermediate shaft and universal joint are utilized so as to make the angle of the steering shaft variable within a predetermined range.

In some known steering assemblies, the steering column shaft includes a bearing and a lock sleeve. For packaging purposes and/or collapse requirements, it is necessary to position the bearing and/or lock sleeve as close as possible to the universal joint. However, such an arrangement makes it difficult to attach the universal joint to the steering column shaft.

SUMMARY OF THE INVENTION

In one aspect of the invention, a yoke for a universal coupling is provided. The yoke includes a base shaft, a pair of yoke ears extending from the base shaft, and at least one of a bearing and a lock sleeve coupled to the base shaft.

In another aspect of the invention, an intermediate shaft for a steering column assembly of a vehicle is provided. The intermediate shaft includes a shaft element, a universal joint coupling including an inner yoke coupled to the shaft element and an outer yoke coupled to the inner yoke, and at least one of a bearing and a lock sleeve coupled to the outer yoke.

In yet another aspect of the invention, a steering column assembly for a vehicle is provided. The steering column assembly includes a steering column shaft and an intermediate shaft coupled to the steering column shaft. The intermediate shaft includes a shaft element, a universal joint coupling including an inner yoke coupled to the shaft element and an outer yoke coupled to the inner yoke, and at least one of a bearing and a lock sleeve coupled to the outer yoke. The outer yoke is coupled to the steering column shaft.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
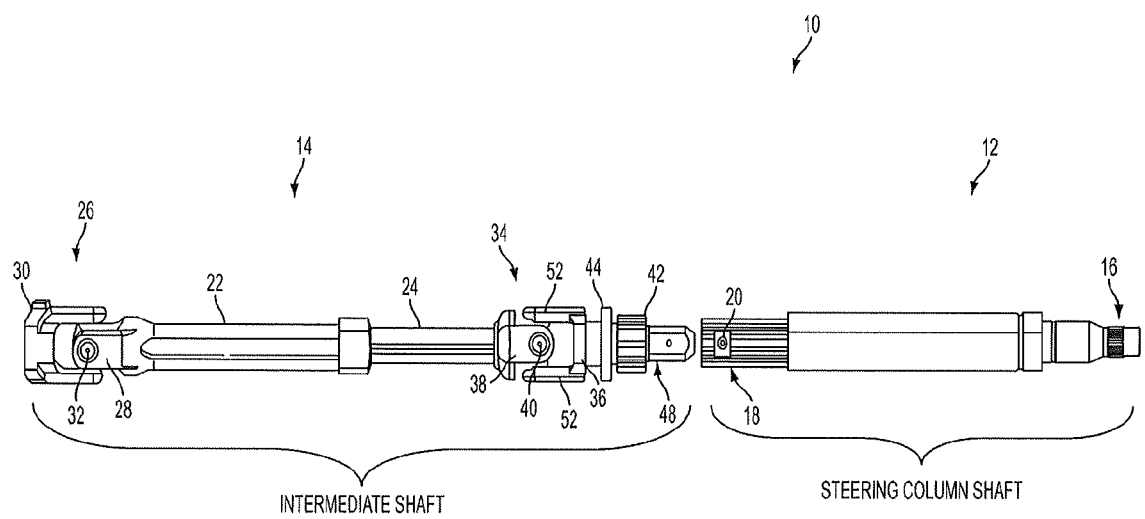
FIG. 1 illustrates an exploded view of an exemplary embodiment of the invention.

Referring now to the Figures, where the invention will be described with reference to specific embodiments, without limiting same, an exemplary embodiment of a steering column assembly 10 for a vehicle is illustrated in FIG. 1. Steering column assembly generally includes a steering column shaft 12 coupled to an intermediate shaft 14.

Steering column shaft 12 includes a first end 16 and an opposite second end 18. First end 16 is configured to couple to a hand wheel (not shown), and second end 18 is a tubular member configured to receive a portion of intermediate shaft 14 for coupling therebetween, as is described herein in more detail. Second end 18 includes an aperture 20 to receive a fastener (e.g., a bolt) therein to couple steering column shaft 12 and intermediate shaft 14. However, second end 18 may be coupled to intermediate shaft 14 by any suitable method such as, for example, press fitting.

Intermediate shaft 14 includes a tubular shaft element 22 and a solid shaft element 24 telescoped into tubular shaft element 22 and coupled thereto by splines or the like for unitary rotation of intermediate shaft 14. A lower universal coupling 26 of intermediate shaft 14 includes an inner yoke 28 rigidly attached to tubular shaft element 22, an outer yoke 30 clamped to a steering gear input shaft (not shown), and a cross or spider 32 between yokes 28, 30. An upper universal coupling 34 of intermediate shaft 14 includes an outer yoke 36 coupled to steering column shaft second end 18, an inner yoke 38, and a cross or spider 40 between yokes 36, 38.

In the exemplary embodiment, intermediate shaft 14 also includes a lock sleeve 42 and a bearing 44. Lock sleeve 42 prevents or hinders rotation of steering column assembly 10 when the vehicle is not in operation, and bearing 44 holds the shaft line in position and provide a low friction interface to rotate shaft 12 and/or 14.

Figure 2A:
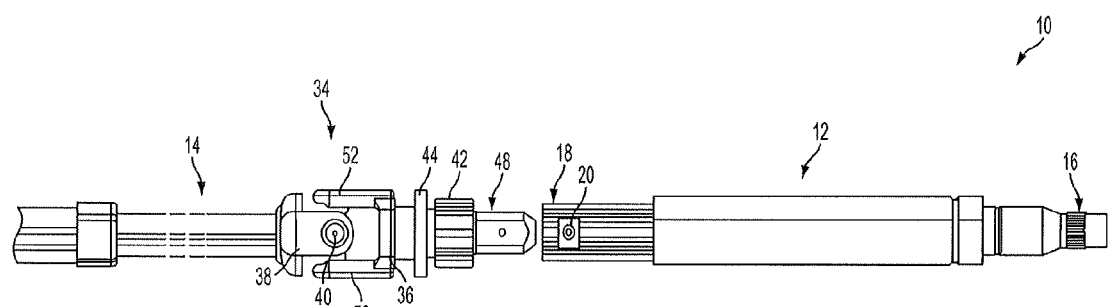
FIG. 2A illustrates an exploded view of an exemplary embodiment of the invention.
Figure 2B:
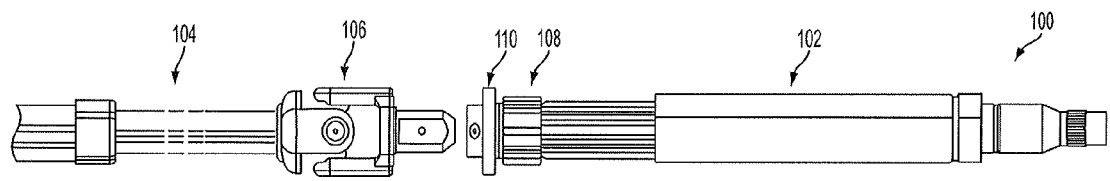
FIG. 2B illustrates an exploded view of a prior art assembly in comparison to the embodiment shown in FIG. 2A.

With reference to FIGS. 2A and 2B, a comparison between steering column assembly 10 (FIGS. 1 and 2A) and a prior art steering column assembly 100 is illustrated. Assembly 100 includes a steering column shaft 102, an intermediate shaft 104 having an upper universal coupling 106, a lock sleeve 108, and a bearing 110. However, as illustrated in FIG. 2A, steering column assembly 10 of the present invention includes outer yoke 36 with an extended shaft 48 that includes lock sleeve 42 and bearing 44. In contrast, as illustrated in FIG. 2B, lock sleeve 108 and bearing 110 are located on steering column shaft 102.

Figure 3A:
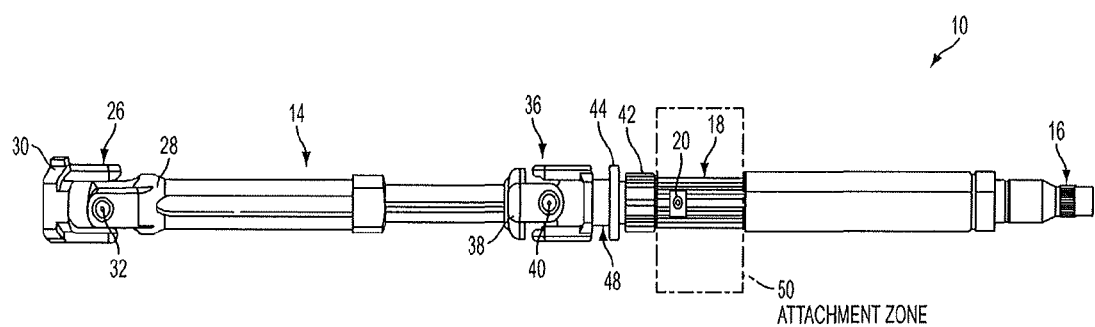
FIG. 3A illustrates an exemplary attachment zone of the embodiment shown in FIG. 2A and after assembly.
Figure 3B:
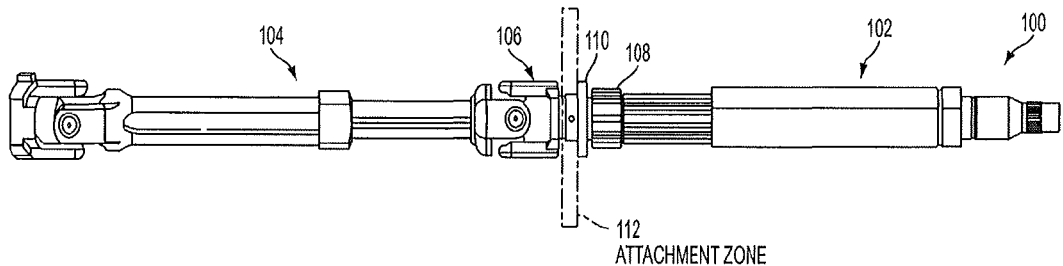
FIG. 3B illustrates an attachment zone of the prior art assembly shown in FIG. 2B after assembly and in comparison to the exemplary attachment zone shown in FIG. 3A.

Due to the arrangement of lock sleeve 42 and bearing 44 on intermediate shaft extended yoke 36, steering column assembly 10 facilitates an enlarged "attachment zone" 50, shown in FIG. 3A. Attachment zone 50 is the area or clearance where assembly tools require access and clearance for coupling steering column shaft 12 and intermediate shaft 14. As compared to the prior art "attachment zone" 112 shown in FIG. 3B, which is smaller and more limited than attachment zone 50, steering column assembly 10 provides a much larger tool clearance and provides added flexibility for methods of coupling steering column shaft 12 and intermediate shaft 14. Accordingly, FIGS. 3A and 3B illustrate the advantage of having bearing sleeve 44 and lock sleeve 42 on intermediate shaft 14 where "attachment zone" or "working zone" 50 is increased in size. As such, the increased assembly tool clearances allow for a more robust attachment between shaft 12 and intermediate shaft 14.

A method of manufacturing steering column assembly 10 is described herein. The method includes providing steering column shaft 12 and providing intermediate shaft 14. Intermediate shaft 14 is formed with lower universal coupling 26 and upper universal coupling 34, which includes outer yoke 36 and inner yoke 38. Outer yoke 36 is provided with an extended base or shaft 48 and lock sleeve 42 and bearing 44 are located on outer yoke 36 adjacent yoke ears 52. Outer yoke 36 is subsequently coupled to steering column shaft 12 by, for example, inserting at least a portion of extended shaft 48 into shaft second end 18 and inserting a fastener (not shown) into aperture 20.

Steering column assemblies and methods are described herein. The exemplary embodiments of the invention have improved attachment zones by extending an intermediate shaft yoke and moving the bearing and lock sleeve to the intermediate shaft instead of locating them on the steering column shaft, as in a typical application. The result is that the length of the overlapping interface can be as long as desired. As a consequence, manufacturing tools and methods are not compromised by the typical limitations of bearing proximity to the yoke ears.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An intermediate shaft for a steering column assembly of a vehicle, the intermediate shaft comprising:
   a shaft element;
   a universal joint coupling including an inner yoke coupled to the shaft element and an outer yoke coupled to the inner yoke, the outer yoke comprising an extended shaft extending away from the shaft element; and
   a bearing and a lock sleeve disposed on an outer surface of the extended shaft and coupled to the outer yoke, the extended shaft configured for coupling to a steering column shaft, the steering column shaft configured for coupling to a hand wheel.

2. The intermediate shaft of claim 1, wherein the shaft element comprises a tubular shaft element coupled to a solid shaft element.

3. The intermediate shaft of claim 2, wherein the inner yoke is coupled to the solid shaft element.

4. The intermediate shaft of claim 1, further comprising a second universal joint coupling coupled to the shaft element.

5. A steering column assembly for a vehicle, the steering column assembly comprising:
   a steering column shaft configured for coupling to a hand wheel; and
   an intermediate shaft coupled to the steering column shaft, the intermediate shaft comprising:
   a shaft element;
   a universal joint coupling including an inner yoke coupled to the shaft element and an outer yoke coupled to the inner yoke, the outer yoke comprising an extended shaft extending away from the shaft element; and
   a bearing and a lock sleeve disposed on the extended shaft and coupled to the outer yoke, wherein the extended shaft is coupled to the steering column shaft.

6. A steering column assembly for a vehicle, the steering column assembly comprising:
   a steering column shaft configured for coupling to a hand wheel; and
   an intermediate shaft coupled to the steering column shaft, the intermediate shaft comprising:
   a shaft element;
   a universal joint coupling including an inner yoke coupled to the shaft element and an outer yoke coupled to the inner yoke, the outer yoke comprising an extended shaft extending away from the shaft element; and
   at least one of a bearing and a lock sleeve disposed on the extended shaft and coupled to the outer yoke, wherein the extended shaft is coupled to the steering column shaft, wherein the steering column shaft does not include a bearing.

7. A steering column assembly for a vehicle, the steering column assembly comprising:
   a steering column shaft configured for coupling to a hand wheel; and
   an intermediate shaft coupled to the steering column shaft, the intermediate shaft comprising:
   a shaft element;
   a universal joint coupling including an inner yoke coupled to the shaft element and an outer yoke coupled to the inner yoke, the outer yoke comprising an extended shaft extending away from the shaft element; and
   at least one of a bearing and a lock sleeve disposed on the extended shaft and coupled to the outer yoke, wherein the extended shaft is coupled to the steering column shaft, wherein the steering column shaft does not include a lock sleeve.

8. A steering column assembly for a vehicle, the steering column assembly comprising
   a steering column shaft configured for coupling to a hand wheel; and
   an intermediate shaft coupled to the steering column shaft, the intermediate shaft comprising:
   a shaft element;

a universal joint coupling including an inner yoke coupled to the shaft element and an outer yoke coupled to the inner yoke, the outer yoke comprising an extended shaft extending away from the shaft element; and at least one of a bearing and a lock sleeve disposed on the extended shaft and coupled to the outer yoke, wherein the extended shaft is coupled to the steering column shaft, wherein the shaft element comprises a tubular shaft element coupled to a solid shaft element.

9. A steering column assembly for a vehicle, the steering column assembly comprising:

a steering column shaft configured for coupling to a hand wheel; and an intermediate shaft coupled to the steering column shaft, the intermediate shaft comprising:

a shaft element;

a universal joint coupling including an inner yoke coupled to the shaft element and an outer yoke coupled to the inner yoke, the outer yoke comprising an extended shaft extending away from the shaft element; and at least one of a bearing and a lock sleeve disposed on the extended shaft and coupled to the outer yoke, wherein the extended shaft is coupled to the steering column shaft, wherein the inner yoke is coupled to the solid shaft element.

10. A steering column assembly for a vehicle, the steering column assembly comprising:

a steering column shaft configured for coupling to a hand wheel;

an intermediate shaft coupled to the steering column shaft, the intermediate shaft comprising:

a shaft element;

a universal joint coupling including an inner yoke coupled to the shaft element and an outer yoke coupled to the inner yoke, the outer yoke comprising an extended shaft extending away from the shaft element; and at least one of a bearing and a lock sleeve disposed on the extended shaft and coupled to the outer yoke, wherein the extended shaft is coupled to the steering column shaft wherein the steering column shaft includes a tubular end and an aperture extending therethrough, wherein the tubular end receives a the extended shaft therein for coupling the intermediate shaft and the steering column shaft; and a fastener inserted into the aperture and the extended shaft to couple the portion of the outer yoke within the tubular first end.

* * * * *